(12) United States Patent
Qian et al.

(10) Patent No.: US 10,699,698 B2
(45) Date of Patent: Jun. 30, 2020

(54) ADAPTIVE PERMUTATION INVARIANT TRAINING WITH AUXILIARY INFORMATION FOR MONAURAL MULTI-TALKER SPEECH RECOGNITION

(71) Applicant: TENCENT TECHNOLOGY (SHENZHEN) COMPANY LIMITED, Shenzhen, Guangdong (CN)

(72) Inventors: Yanmin Qian, Shanghai (CN); Dong Yu, Bothell, WA (US)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 159 days.

(21) Appl. No.: 15/940,246

(22) Filed: Mar. 29, 2018

(65) Prior Publication Data
US 2019/0304438 A1 Oct. 3, 2019

(51) Int. Cl.
*G10L 15/00* (2013.01)
*G10L 15/06* (2013.01)

(52) U.S. Cl.
CPC .................. *G10L 15/063* (2013.01)

(58) Field of Classification Search
CPC ....................................................... G10L 15/00
USPC .... 704/243, 202, 226, 9, 235, 233; 707/746, 707/747; 706/25, 20
See application file for complete search history.

(56) References Cited

U.S. PATENT DOCUMENTS

| | | | | |
|---|---|---|---|---|
| 9,620,108 B2* | 4/2017 | Sak | ................. | G10L 15/02 |
| 9,786,270 B2* | 10/2017 | Senior | ................. | G10L 15/063 |
| 9,799,327 B1* | 10/2017 | Chan | ................. | G06F 40/12 |
| 9,818,431 B2* | 11/2017 | Yu | ................. | G10L 25/30 |
| 9,858,919 B2 | 1/2018 | Saon | | |
| 10,032,498 B2* | 7/2018 | Neil | ................. | G06N 3/0445 |
| 10,255,905 B2* | 4/2019 | Chua | ................. | G10L 13/10 |
| 10,381,020 B2* | 8/2019 | Ramprashad | ....... | G10L 21/0232 |
| 10,387,769 B2* | 8/2019 | Neil | ................. | G06N 3/08 |
| 10,460,727 B2* | 10/2019 | Droppo | ................. | G10L 15/063 |
| 2011/0173208 A1* | 7/2011 | Vogel | ................. | G10L 25/48 |
| | | | | 707/746 |
| 2014/0257803 A1 | 9/2014 | Yu et al. | | |
| 2016/0034812 A1* | 2/2016 | Gibson | ................. | G06N 3/08 |
| | | | | 706/25 |
| 2016/0098632 A1* | 4/2016 | Sutskever | ................. | G06N 3/0445 |
| | | | | 706/25 |
| 2016/0111108 A1* | 4/2016 | Erdogan | ................. | G10L 21/0216 |
| | | | | 704/202 |

(Continued)

OTHER PUBLICATIONS

Kenny, Patrick et al., "Eigenvoice Modeling With Sparse Training Data", IEEE Transactions on Speech and Audio Processing, May 2005, pp. 345-354, vol. 13, No. 3.

(Continued)

*Primary Examiner* — Michael Colucci
(74) *Attorney, Agent, or Firm* — Sughrue Mion, PLLC

(57) ABSTRACT

Provided are a speech recognition training processing method and an apparatus including the same. The speech recognition training processing method includes acquiring a stream of speech data from one or more speakers, extracting an auxiliary feature corresponding to a speech characteristic of the one or more speaker and updating an acoustic model by performing permutation invariant training (PIT) model training based on the auxiliary feature.

19 Claims, 11 Drawing Sheets

(56) References Cited

U.S. PATENT DOCUMENTS

| | | | | |
|---|---|---|---|---|
| 2016/0180215 | A1* | 6/2016 | Vinyals | G06F 40/205 |
| | | | | 706/20 |
| 2017/0337924 | A1* | 11/2017 | Yu | G06K 9/6246 |
| 2017/0372200 | A1* | 12/2017 | Chen | G06N 3/08 |
| 2018/0060301 | A1* | 3/2018 | Li | G06F 40/35 |
| 2018/0157743 | A1* | 6/2018 | Hori | G06N 3/0445 |
| 2018/0233130 | A1* | 8/2018 | Kaskari | G10L 15/063 |
| 2018/0247639 | A1* | 8/2018 | Liu | G10L 15/063 |
| 2018/0254040 | A1* | 9/2018 | Droppo | G10L 17/18 |
| 2018/0336884 | A1* | 11/2018 | Sriram | G10L 15/183 |
| 2019/0042932 | A1* | 2/2019 | Bhat | G06F 17/18 |
| 2019/0122101 | A1* | 4/2019 | Lei | G06F 17/16 |
| 2019/0130628 | A1* | 5/2019 | Cao | G06K 9/00201 |
| 2019/0139563 | A1* | 5/2019 | Chen | G10L 21/0216 |
| 2019/0304437 | A1* | 10/2019 | Qian | G10L 15/063 |
| 2019/0304438 | A1* | 10/2019 | Qian | G10L 15/07 |

OTHER PUBLICATIONS

Yu, Dong et al., Permutation Invariant Training of Deep Models for Speaker-Independent Multi-Talker Speech Separation, IEEE, ICASSP, 2017, pp. 241-245.

Qian, Yanmin et al., "Very Deep Convolutional Neural Networks for Noise Robust Speech Recognition", IEEE/ACM Transactions on Audio, Speech, and Language Processing, Dec. 2016, pp. 2263-2276, vol. 24, No. 12.

Qian, Yanmin et al., "Single-Channel Multi-talker Speech Recognition with Permutation Invariant Training", IEEE/ACM Transactions on Audio, Speech, and Language Processing, Jul. 19, 2017, pp. 1-11.

Abdel-Hamid, Ossama et al., "Convolutional Neural Networks for Speech Recognition", IEEE/ACM Transactions on Audio, Speech, and Language Processing, Oct. 2014, pp. 1533-1545, vol. 22, No. 10.

Kolbaek, Morten et al., "Multitalker Speech Separation With Utterance-Level Permutation Invariant Training of Deep Recurrent Neural Networks", IEEE/ACM Transactions on Audio, Speech, and Language Processing, Oct. 2017, pp. 1901-1913, vol. 25, No. 10.

Yu, Dong et al., "Recognizing Multi-talker Speech with Permutation Invariant Training", arXiv:1704.01985 [cs.SD], Jun. 19, 2017 [online], [retrieved on May 28, 2019], Retrieved from the Internet URL:https://arxiv.org/pdf/1704.01985.pdf, 5 pages.

Chen, Zhehuai et al., "Progressive Joint Modeling in Unsupervised Single-channel Overlapped Speech Recognition" arXiv: 1707.07048 [cs.CL], Oct. 20, 2017 [online], [retrieved on May 28, 2019], Retrieved from the Internet URL:https://arxiv.org/pdf/1707_07048.pdf, pp. 1-14.

Tan, Tian et al., "Knowledge Transfer in Permutation Invariant Training for Single-Channel Multi-Talker Speech Recognition" 2018 IEEE International Conference on Acoustics, Speech and Signal Processing (ICASSP), Apr. 15-20, 2018 [online], [retrieved on May 28, 2019], Retrieved from the 10.1109/ICASSP.2018.8461883>', pp. 5.

Ghahremani, Pegah et al., "A Pitch Extraction Algorithm Tuned for Automatic Speech Recognition", IEEE International Conference on Acoustic, Speech and Signal Processing (ICASSP), 2014, pp. 2494-2498.

Sainath, Tara n. et al., "Deep Convolutional Neural Networks for Large-scale Speech Tasks", Neural Networks 64,2015, pp. 39-48.

Yu, Dong et al., "Deep Convolutional Neural Networks with Layer-wise Context Expansion and Attention", Interspeech, ISCA, Sep. 8-12, 2016, pp. 17-21, San Francisco, USA.

International Search Report issued in International Application No. PCT/US2019/024777 dated Jul. 15, 2019, 2 pages.

Ba, Jimmy, et al., "Do Deep Nets Really Need to be Deep?", in NIPS, 2014, pp. 1-10.

Li, Jinyu et al, "Learning Small-Size DNN with Output-Distribution-Based Criteria", in Interspeech, 2014; 5 pages.

Chan, William, et al., "Transferring knowledge from a RNN to a DNN", in Interspeech, 2015; 5 pages.

Hinton, Geoffrey, et al., "Distilling the Knowledge in a Neural Network", CoRR, vol. abs/1503.02531, 2015; pp. 1-9.

Lu, Liang, et al., "Knowledge distillation for small-footprint highway networks", in ICASSP. IEEE, 2017, pp. 4820-4824.

Watanabe, Shinji, et al., "Student-teacher network learning with enhanced features", in Interspeech, 2017, pp. 5275-5279.

Li, Jinyu, et al., "Large-Scale Domain Adaptation Via Teacher-Student Learning", in Interspeech, 2017, pp. 2386-2390.

Chebotar, Yevgen et al., "Distilling knowledge from ensembles of neural networks for speech recognition", in Interspeech, 2016, pp. 3439-3443.

International Search Report Application No. PCT/US2019/024781; dated Jul. 2, 2019, 2 pages.

Xiong et al., "The Microsoft 2016 conversational speech recognition system", in ICASSP, 2017, pp. 5255-5259.

Ghahramani, Zoubin, et al., "Factorial hidden Markov Models", Machine Learning 1997, pp. 1-31.

Cooke, Martin, et al., "Monaural speech separation and recognition challenge", Computer Speech & Language, 2009, vol. 24, No. 1, pp. 1-23.

Weng, Chao, et al., "Deep Neural Networks for Single-Channel Multi-Talker Speech Recognition", TASLPP, vol. 23, No. 10, pp. 1670-1679, 2015.

Hershey, J. R., et al., "Deep clustering: Discriminative embeddings for segmentation and separation", ICASSP, Mar. 2016, pp. 31-35.

Isik et al., "Single-Channel Multi-Speaker Separation using deep Clustering", in Interspeech, Sep. 2016, pp. 545-549.

Chen, Zhuo, et al., "Deep Attractor Network for Single-Microphone Speaker Separation", in ICASSP, 2017, pp. 246-250.

Swietojanski, Pawel, et al., "Learning Hidden Unit Contributions for Unsupervised Speaker Adaptation of Neural Network Acoustic Models", SLT. IEEE, 2014, pp. 171-176.

M. J .F. Gales, "Maximum Likelihood Linear Transformations for HMM-Based Speech Recognition", Computer Speech and Language, vol. 12, pp. 75-98, 1998.

Yao, Kaisheng, et al., "Adaptation of Context-Dependent Deep Neural Networks for Automatic Speech Recognition", SLT. IEEE, 2012, pp. 366-369.

Siniscalchi, Sabato Marco, et al., "Hermitian Polynomial for Speaker Adaptation of Connectionist Speech Recognition Systems", TASLP, vol. 21, No. 10, pp. 1-10, 2013.

Yu, Dong, et al., "KL-Divergence Regularized Deep Neural Network Adaptation for Improved Large Vocabulary Speech Recognition", ICASSP, IEEE, 2013, pp. 7893-7897.

Seltzer, Michael L., et al., "An Investigation of Deep Neural Networks for Noise Robust Speech Recognition", ICASSP. IEEE, 2013, pp. 7398-7402.

Girt, Ritwik, et al., "Improving Speech Recognition in Reverberation Using A Room-Aware Deep Neural Network and Multi-Task Learning", ICASSP. IEEE, 2015, pp. 5014-5018.

De Cheveigné, Alain, et al., "Yin, a fundamental frequency estimator for speech and music", the Journal of the Acoustical Society of America, vol. 111, No. 4, pp. 1917-1930, 2002.

Talkin, David, "A Robust Algorithm for Pitch Tracking (RAPT)", Speech Coding and Synthesis, Chapter 14, 1995, 495-518.

Wu, Mingyang, et al., "A Multipitch Tracking Algorithm for Noisy Speech", TSAP, vol. 11, No. 3, pp. I-369-372, 2002.

Camacho, Arturo, "Swipe: A Sawtooth Waveform Inspired Pitch Estimator for Speech and Music", University of Florida; pp. 1-116, 2007.

Gupta, Vishwa, et al., "I-Vector-Based Speaker Adaptation of Deep Neural Networks for French Broadcast Audio Transcription", ICASSP. IEEE, 2014, pp. 6334-6338.

Qian, Yanmin, et al., "Very Deep Convolutional Neural Networks for Robust Speech Recognition", SLT. IEEE, Oct. 2, 2016, pp. 481-488.

Wang, Yannan, et al., "A Gender Mixture Detection Approach to Unsupervised Single-Channel Speech Separation Based on Deep Neural Networks", TASLP, vol. 25, No. 7, pp. 1535-1546, 2017.

Povey, Daniel, et al., "The Kaldi Speech Recognition Toolkit", ASRU, 2011, No. EPFL-CONF-192584; 4 pages.

(56) References Cited

OTHER PUBLICATIONS

Agarwal, Amit, et al., "An Introduction to Computational Networks and the Computational Network Toolkit", Tech. Rep., Microsoft Technical Report MSR-TR-2014-112, 2016, 150 pages.

Seide, Frank, et al., "1-Bit Stochastic Gradient Descent and Its Application to Data-Parallel Distributed Training of Speech DNNs", Interspeech, 2014, pp. 1058-1062.

Yu, Dong, et al., Automatic Speech Recognition: A Deep Learning Approach, Springer, 2015, 329 pages.

* cited by examiner

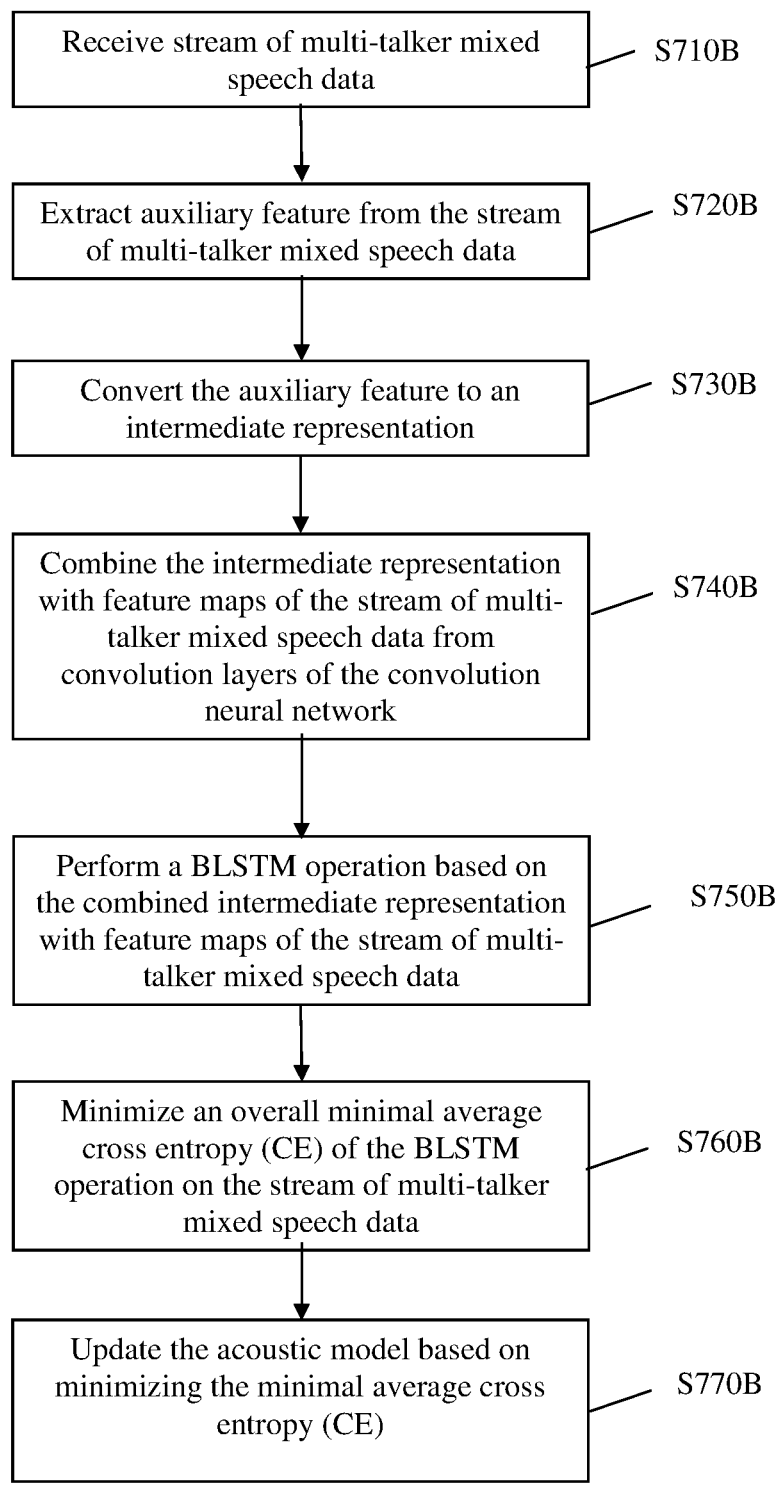

ADAPTIVE PERMUTATION INVARIANT TRAINING WITH AUXILIARY INFORMATION FOR MONAURAL MULTI-TALKER SPEECH RECOGNITION

BACKGROUND

1. Field

The present disclosure relates to methods and apparatus for performing speech recognition, particularly, adaptive permutation invariant training for multi-talker speech recognition.

2. Description of the Related Art

In related art, many attempts have been made to address a "label ambiguity" or a "label permutation" problem in a speech recognition scenario where multiple talkers speak at the same time and only a single channel of mixed speech is available, but the results have been unsatisfactory. For instance, Non-patent Literature (NPL) document 1 describes a deep learning model to recognize the mixed speech directly by assigning the senone labels of the talkers according to the energy of the speech. To deal with the speaker switch problem, NPL document 1 describes using a two-talker joint-decoder with a speaker switching penalty was used to trace speakers. Further, NPL document 2 describes a technique called deep clustering (DPCL) to separate the speech streams by mapping a speaker's time-frequency bins into an embedding space where the bins belong to the same speakers are close and that of different speakers are far away from each other. Moreover, NPL document 3 describes a technique called deep attractor network (DANet) which learns a high-dimensional embedding of the acoustic signals and clustered embeddings with attractor points.

Despite the progresses made in monaural multi-talker speech recognition, the word error rates (WER) reported in previous works are still much higher than that in single-talker cases. In single-talker speech recognition, speaker adaptation reduces the mismatch between the training and the test speakers and improves the WER for the test speakers.

NPL DOCUMENTS

NPL document 1: Chao Weng, Dong Yu, Michael L. Seltzer, and Jasha Droppo, "Deep neural networks for single-channel multi-talker speech recognition," TASLP, vol. 23, no. 10, pp. 1670-1679, 2015.
NPL document 2: J. R. Hershey, Z. Chen, J. Le Roux, and S. Watanabe, "Deep clustering: Discriminative embeddings for segmentation and separation," in ICASSP, 2016, pp. 31-35.
NPL document 3: Zhuo Chen, Yi Luo, and Nima Mesgarani, "Deep attractor network for single-microphone speaker separation," in ICASSP, 2017, pp. 246-250.
NPL document 4: Yannan Wang, Jun Du, Li-Rong Dai, and Chin-Hui Lee, "A gender mixture detection approach to unsupervised single-channel speech separation based on deep neural networks," TASLP, vol. 25, no. 7, pp. 1535-1546, 2017.
NPL document 5: Yanmin Qian, Xuankai Chang, and Dong Yu, "Single-channel multi-talker speech recognition with permutation invariant training," submitted to TASLP, CoRR, vol. abs/1707.06527, 2017.

SUMMARY

Provided are methods of performing adaptive permutation invariant training for monaural multi-talker speech recognition, and apparatuses for performing the same. According to some embodiments, provided are methods of performing adaptive permutation invariant training for a scenario where multiple talkers speak at the same time and only a single channel of mixed speech is available, and apparatuses for performing the same According to one or more embodiments of the disclosure, there is provided adaptation techniques to perform on monaural multi-talker speech recognition. According to one or more embodiments, auxiliary feature assisted adaptive training is developed for the PIT-ASR model, which provides appropriate speaker-dependent feature and structure that can make the speaker tracing easier in PIT and lead to better recognition accuracy. The auxiliary features of the present disclosure, may include but not limited to, pitch and i-vectors of the mixed utterance. Also, one or more exemplary embodiments, may exploit the gender information in the mixed speech with a multi-task learning architecture that jointly optimizes for the speech recognition and gender-pair prediction.

According to an aspect of the disclosure, there is provided a method of performing speech recognition training, the method comprising: acquiring, by the at least one processor, multi-talker mixed speech data corresponding to a plurality of speakers; extracting, by the at least one processor, an auxiliary feature corresponding to a speech characteristic of the plurality of speakers; and updating, by the at least one processor, an acoustic model by performing permutation invariant training (PIT) model training based on the auxiliary feature.

The performing the PIT model training based on the auxiliary feature comprises: augmenting speech features in the multi-talker mixed speech data with the speech characteristic of the plurality of speakers.

The performing the PIT model training based on the auxiliary feature comprises: performing a bidirectional long-short term memory (BLSTM) operation on the multi-talker mixed speech data by automatically assigning labels to the speech features of the multi-talker mixed speech data and generating a plurality of estimated output segments for the multi-talker mixed speech data; and minimizing a minimal average cross entropy (CE) for utterances of all possible label assignments corresponding to the plurality of estimated output segments for the multi-talker mixed speech data based on a first equation:

$$J = \frac{1}{S} \min_{s' \in permu(S)} \sum_s \sum_t CE(l_t^{s'}, y_t^s),$$

wherein permu(S) is a permutation of $1, \ldots, S$, ls is a ground truth label and ys is an estimated output segment among the plurality of estimated output segments of the multi-talker mixed the speech data.

The performing the PIT model training based on the auxiliary feature comprises: performing a bidirectional long-short term memory recurrent neural networks (BLSTM-RNN) operation on the multi-talker mixed speech data by augmenting speech features in the multi-talker mixed speech data with the speech characteristic of the plurality of speakers.

The performing the PIT model training based on the auxiliary feature comprises: converting the auxiliary feature to an intermediate representation; and performing a convolutional neural network bidirectional long-short term memory (CNN-BLSTM) operation on the multi-talker mixed speech data by combining the intermediate representation with feature maps of the multi-talker mixed speech data from convolution layers of the CNN.

The auxiliary feature is one of pitch and i-vector uniquely identifying the plurality of speakers.

The updating the acoustic model comprises: performing a multi-task learning framework, in which, an additional operation corresponding to the auxiliary feature is performed while the BLSTM operation on the multi-talker mixed speech data is performed. The additional operation may comprise: calculating a second equation:

$$J^{MTL} = J + \lambda \sum_t CE(l_t^{2nd}, O_t^{2nd}),$$

wherein $I^{2nd}$ is a ground truth label of the additional operation and $O^{2nd}$ is an output segment of the additional operation, and wherein the acoustic model is updated based on a result of the calculating the second equation.

The auxiliary feature maybe a gender classification of the plurality of speakers.

According to another aspect of the present disclosure, there is provided a speech recognition training apparatus comprising: a memory; and a processor configured to: acquire multi-talker mixed speech data corresponding to a plurality of speakers; extract an auxiliary feature corresponding to a speech characteristic of the plurality of speakers; and update an acoustic model by performing permutation invariant training (PIT) model training based on the auxiliary feature.

The processor maybe further configured to perform the PIT model training based on the auxiliary feature by augmenting speech features in the multi-talker mixed speech data with the speech characteristic of the plurality speakers.

The processor maybe further configured to perform the PIT model training based on the auxiliary feature by: performing a bidirectional long-short term memory (BLSTM) operation on the multi-talker mixed speech data by automatically assigning labels to the speech features of the multi-talker mixed speech data and generating a plurality of estimated output segments for the multi-talker mixed speech data; and minimizing a minimal average cross entropy (CE) for utterances of all possible label assignments corresponding to the plurality of estimated output segments for the multi-talker mixed speech data according to the following equation:

$$J = \frac{1}{S} \min_{s' \in permu(S)} \sum_s \sum_t CE(l_t^{s'}, y_t^s),$$

wherein permu(S) is a permutation of 1, ..., S, $I^s$ is a ground truth alignment and $y^s$ is the plurality of estimated output segments of the streams of the speech data.

The processor maybe further configured to perform the PIT model training based on the auxiliary feature comprises by performing a bidirectional long-short term memory recurrent neural networks (BLSTM-RNN) operation on the multi-talker mixed speech data by augmenting speech features in the multi-talker mixed speech data with the speech characteristic of the plurality of speakers.

The processor maybe further configured to perform the PIT model training based on the auxiliary feature comprises by: converting the auxiliary feature to an intermediate representation; and performing a convolutional neural network bidirectional long-short term memory (CNN-BLSTM) operation on the multi-talker mixed speech data by combining the intermediate representation with feature maps of the multi-talker mixed speech data from convolution layers of the CNN.

The auxiliary feature maybe one of pitch and i-vector uniquely identifying the plurality of speakers.

The processor maybe further configured to update the acoustic model by performing a multi-task learning framework, in which, an additional operation corresponding to the auxiliary feature is performed while the BLSTM operation on the multi-talker mixed speech data is performed.

The additional operation may comprise: calculating a second equation:

$$J^{MTL} = J + \lambda \sum_t CE(l_t^{2nd}, O_t^{2nd}),$$

wherein $I^{2nd}$ is a ground truth label of the additional operation and $O^{2nd}$ is an output segment of the additional operation, and wherein the acoustic model is updated based on a result of the calculating the second equation.

The auxiliary feature maybe a gender classification of the plurality of speakers.

According to another aspect of the present disclosure, there is provided a non-transitory computer readable medium having stored thereon a program for a method of performing speech recognition, the method comprising: acquiring multi-talker mixed speech data corresponding to a plurality of speakers; extracting an auxiliary feature corresponding to a speech characteristic of the plurality of speakers; and updating an acoustic model by performing permutation invariant training (PIT) model training based on the auxiliary feature.

BRIEF DESCRIPTION OF THE DRAWINGS

These and/or other aspects will become apparent and more readily appreciated from the following description of the embodiments, taken in conjunction with the accompanying drawings in which:

FIGS. 7A and 7B are flowcharts illustrating operations of the auxiliary feature assisted adaptation in the PIT architecture of FIG. 6 according to an embodiment.

DETAILED DESCRIPTION

Figure 1A:
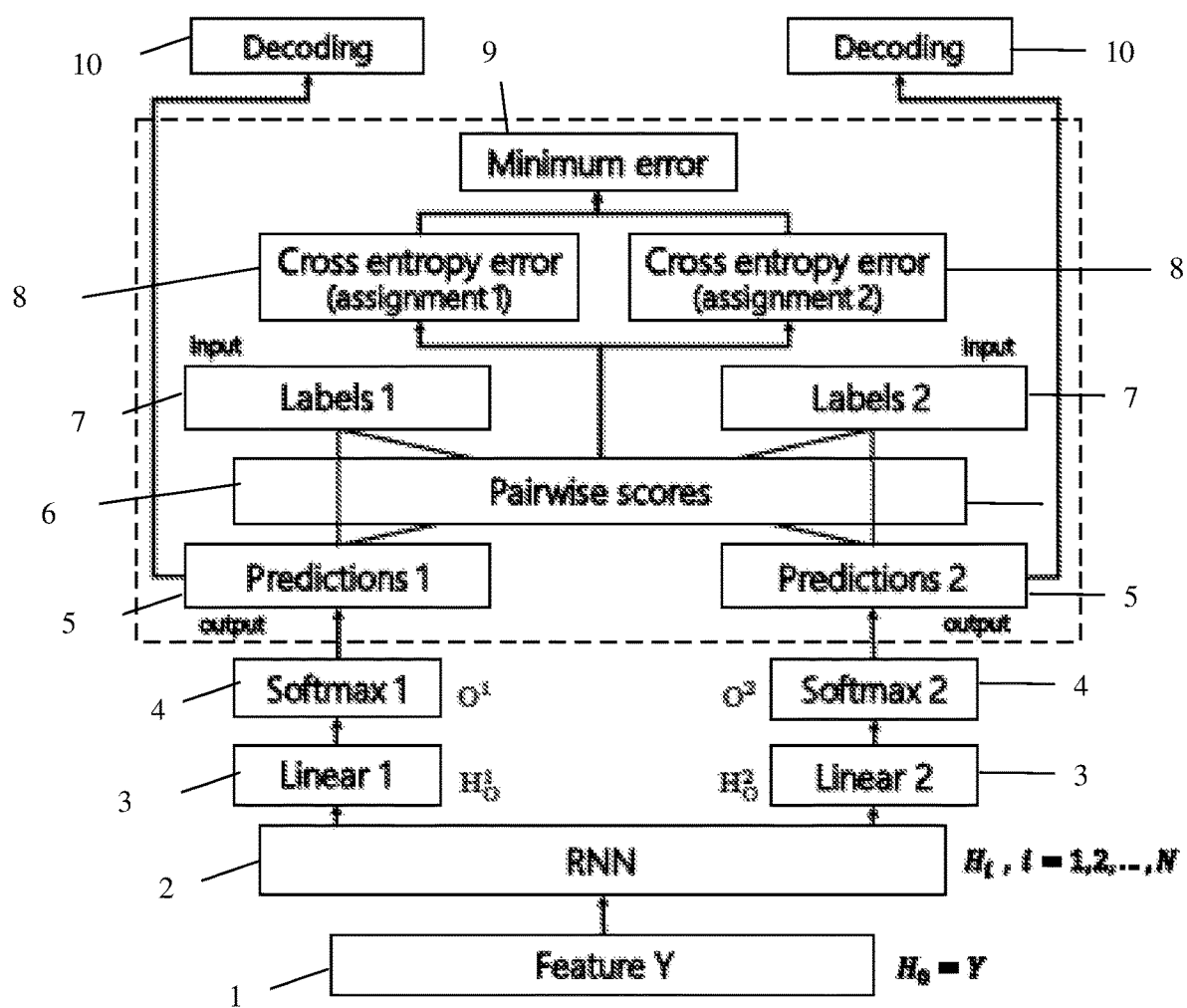
FIG. 1A is a block diagram illustrating a PIT architecture for speech recognition training.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, PIT processing methods and apparatuses according to embodiments will be described in detail with reference to the accompanying drawings. The term such as "comprise" or "include" used herein should not be construed as necessarily including all of the elements or operations (or steps) described herein, and should be construed as not including some of the described elements or operations (or steps) or as further including additional elements or operations (or steps).

Although terms such as "first" and "second" may be used herein to describe various elements or components, the elements or components should not be limited by the terms. These terms are only used to distinguish one element or component from another element or component.

One or more embodiments of the present disclosure may address the multi-talker speech recognition, which recognize the multi-talker mixed overlap speech, in the scenario, such as cocktail party environment or other group environment.

Figure 1B:
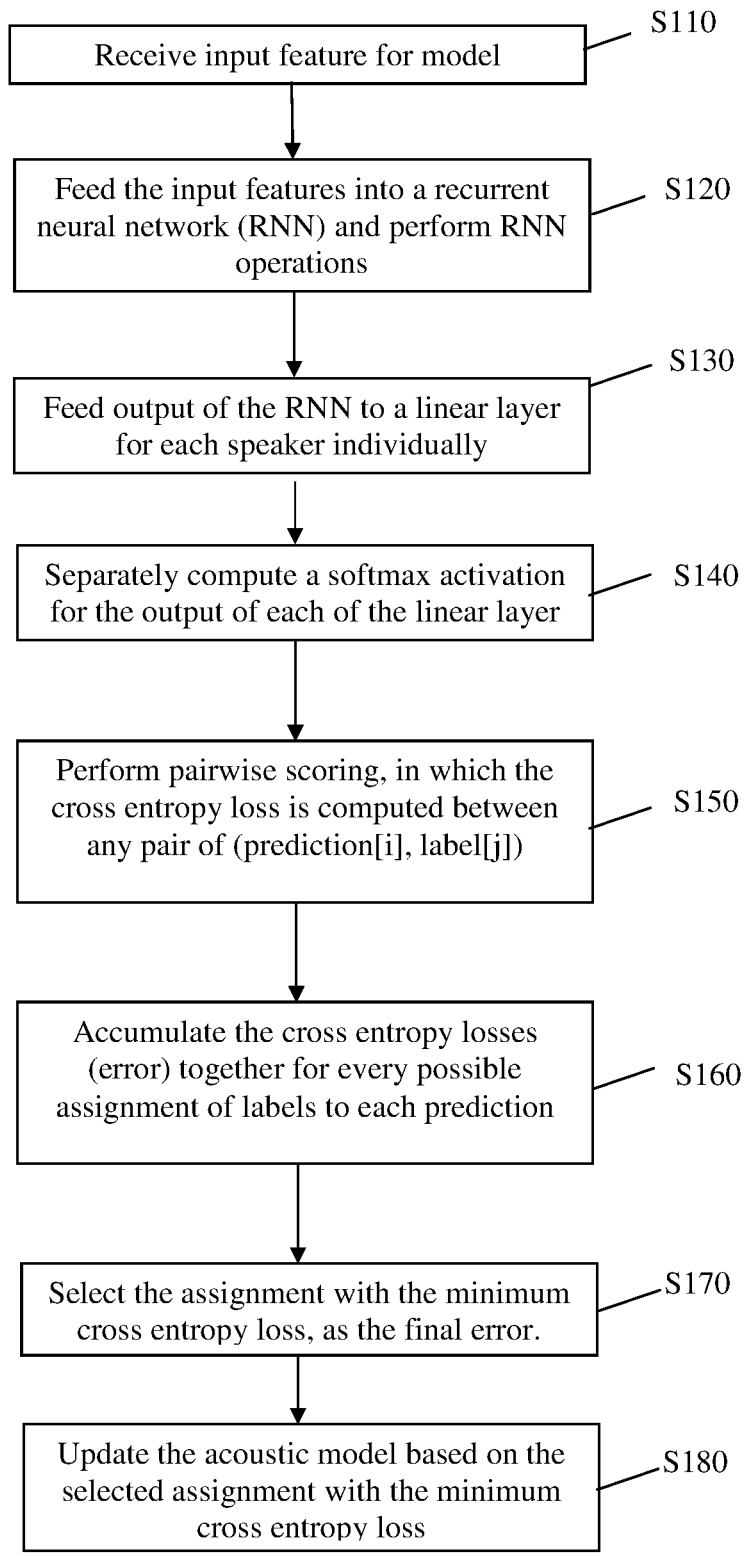
FIG. 1B is flowchart illustrating operations of a PIT architecture for speech recognition training.

Permutation invariant training (PIT) is a technique for solving the label ambiguity problem in deep learning based multi-talker speech recognition. The basic architecture of PIT for multi-talker automatic speech recognition (PIT-ASR) is depicted in FIG. 1. In this model, the mixed speech O is sent to the deep learning model to estimate the state-level posterior for each talker. For better ability of modeling long-range dependency, which can improve speaker tracing, recurrent neural networks (RNNs) are usually used. In FIGS. 1A and 1B, bidirectional long-short term memory RNNs (BLSTM-RNNs) are applied in all models.

According to PIT technique illustrated in FIG. 1A, layer 1 represents an input feature Y for the model. In layer 2, the input features are fed into a recurrent neural network (RNN) in layer 2. The RNN layer 2 may further include bidirectional long-short term memory RNNs (BLSTM-RNNs). Next, in linear layer 3, the output of the RNN layer 2 may go through linear1 and linear2 for each speaker individually. For instance, a first output of the RNN layer 2 corresponding to a first speaker may be input through a linear1 and a second output of the RNN layer 2 corresponding to a second speaker may be input through a linear2. Thereafter, the outputs from the linear layer 3, i.e., linear1 and linear2, are fed into softmax1 and softmax 2, respectively, of the softmax layer 4, which computes a softmax activation. The softmax activation may be referred to as the senone posteriori in speech recognition tasks. The output of the softmax activation in softmax1 and softmax2 may be considered as predictions1 and predictions2 in prediction layer 5.

Next, in input layer 7, label inputs for the input features Y are input as labels1 and labels2. In pairwise scoring layer 6, pairwise scoring is performed, in which the cross entropy loss is computed between any pair of (prediction[i], label[j]), where i and j may be 1, . . . , n. For instance, in illustrative FIG. 1A, the cross entropy loss may be computed between (predictions1, labels1), (predictions1, labels2), (prediction2, labels1) and (prediction2, labels2). In assignment layer 8, the cross entropy losses (error) are accumulated together for every possible assignment of labels to each prediction, which is the permutations of labels' order. For instance, in assignment1, the cross entropy losses (error) are accumulated together for every possible assignment of labels to predictions1 and in assignment2, the cross entropy losses (error) are accumulated together for every possible assignment of labels to prediction2. In layer 9, assignment, among assignment1 and assignment2, with the minimum cross entropy loss is selected as the final error. Accordingly, the model is updated based on the determined final error. Also, the prediction result from the updated model may be used for decoding an input speech data in decoding layer 10.

According to an embodiment, one or more of the layers may be implemented by one or more units or modules. Moreover, each or the one or more units or modules may be implemented by a hardware processor.

FIG. 1B illustrates a method of performing PIT model training for speech recognition training. In operation S110, input feature Y for the model for is received. The input feature may be input feature maps. In operation S120, the input features are fed into a recurrent neural network (RNN) and RNN operations are performed. The RNN operations may further include BLSTM-RNN operations. Next, in operation S130, the output of the RNN operations fed through a linear layer for each speaker individually. Thereafter, in operation S140, softmax activations are separately computed on the outputs from the linear layer.

In operation S150, pairwise scoring is performed, in which, cross entropy loss is computed between any pair of (prediction[i], label[j]), label inputs for the input features Y are input as labels1 and labels2 and the output of the softmax activation in softmax1 and softmax2 may be considered as predictions1 and predictions2. For instance, in illustrative FIG. 1A, the cross entropy loss may be computed between (predictions1, labels1), (predictions1, labels2), (prediction2, labels1) and (prediction2, labels2).

In operation S160. the cross entropy losses (error) are accumulated together for every possible assignment of labels to each prediction, which is the permutations of labels' orders. For instance, in assignment1, the cross entropy losses (error) are accumulated together for every possible assignment of labels to predictions1 and in assignment2, the cross entropy losses (error) are accumulated together for every possible assignment of labels to prediction2.

In operation S170, assignment, among assignment1 and assignment2, with the minimum cross entropy loss is selected as the final error, and in operation S180, the model is updated based on the determined final error.

One of the key ingredients in PIT is its training criterion and the objective function in PIT is defined as $$J = \frac{1}{S} \min_{s' \in permu(S)} \sum_s \sum_t CE(l_t^{s'}, y_t^s),$$

where s is a permutation of [1, 2, ..., S], $l^s$ be the ground truth alignment, $y^s$ be estimated state-posterior of stream s, $l_{t,s'_s}^{s_1}$ is the ground truth label of stream $s'_s$ at frame t. PIT aims to minimize the minimal average cross entropy (CE) of the whole utterance among all possible assignments of the reference to the estimated posterior.

With this criterion, the network can automatically estimate the assignment. The CE is computed over the whole utterance so that all frames that belong to the same speaker are forced to be aligned with the same output segment (or branch). In particular, since PIT calculates the errors of all the possible assignment and chooses the minimum one (which is the most appropriate assignment), the PIT is able to automatically find the appropriate assignment.

Moreover, compared to Deep clustering (DPLC) or DANet, the PIT structure in FIG. 1A is much simpler since it allows direct multi-talker mixed speech recognition without explicit separation. After the PIT model training, the individual output posterior stream can be used for decoding as normal to obtain the final recognition result.

Although the PIT framework has been used for single-channel multi-talker speech recognition, the accuracy of speech recognition is far from the accuracy of the normal single-talker ASR scenario.

One or more embodiments of the present disclosure provide techniques and technologies that improve system performance for single-channel multi-talker speech recognition. According to one or more embodiments, adaptation technologies are integrated into the PIT framework. More specifically, auxiliary features assisted adaptation techniques are developed, including using pitch and i-vector as an additional feature in the model input, and using gender information with multi-task learning which jointly optimizes for the speech recognition and speaker-pair prediction. Moreover, according to one or more embodiments, the BLSTM-RNNs used in the PIT-ASR model may be replaced with the CNN-BLSTM structure to achieve a better system performance. Accordingly, the one or more embodiments of the present disclosure may recognize the multi-talker mixed speech with a more robust performance.

Figure 2:
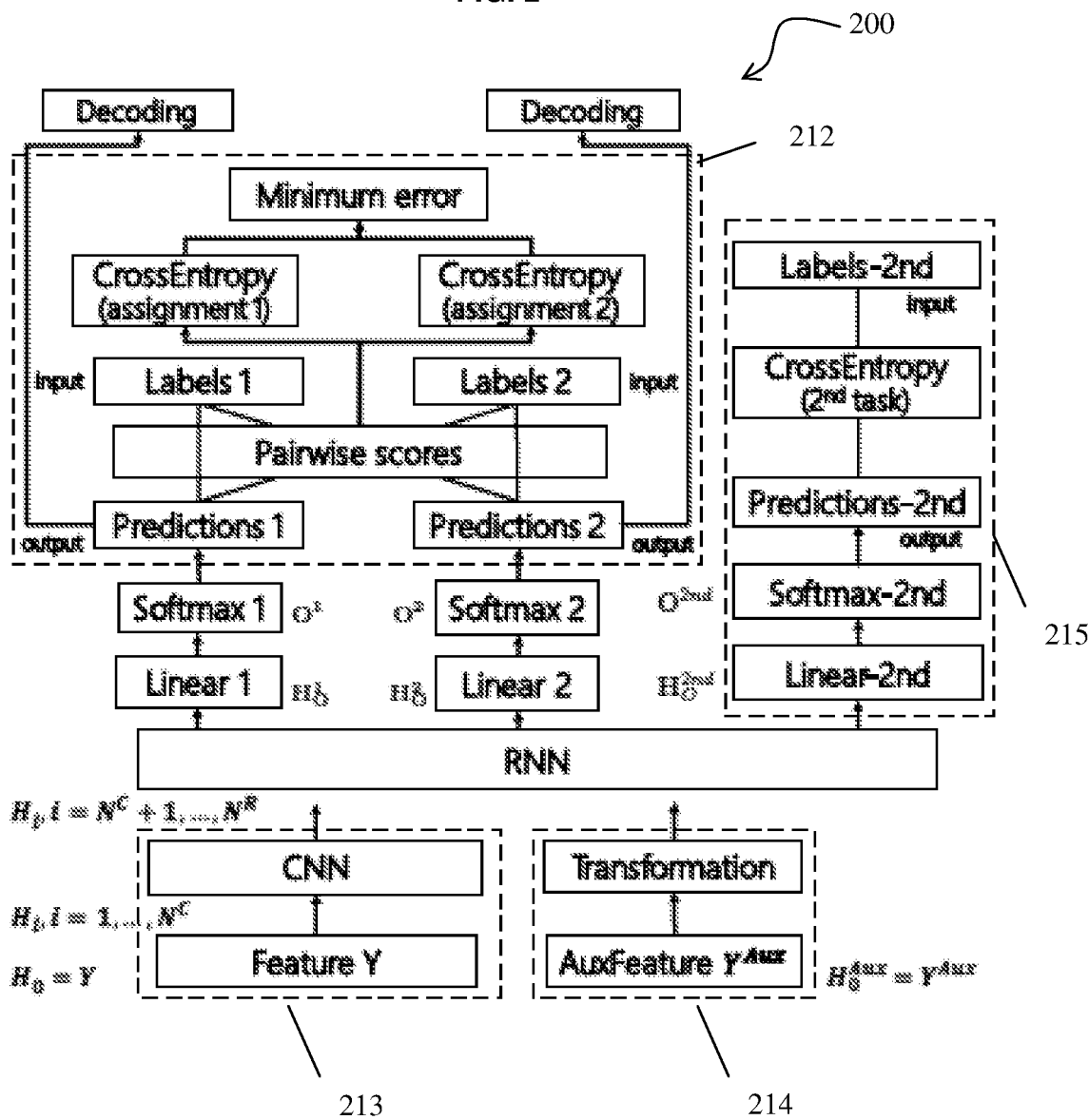
FIG. 2 is a block diagram illustrating an adaptive PIT architecture according to an embodiment.

FIG. 2 is a block diagram illustrating the adaptive permutation invariant training architecture 200 according to an embodiment. The adaptive permutation invariant training architecture 200 may include a PIT feature 212, a convolutional neural network (CNN) feature 213, an auxiliary feature assisted adaption feature 214 and an additional task feature 215 for multitask learning. According to another embodiment, the adaptive permutation may not include all of the PIT feature 212, the CNN feature 213, the auxiliary feature assisted adaption feature 214 and the additional task feature 215. Instead, the adaptive permutation invariant training architecture 200 may include some of the PIT feature 212, a CNN feature 213, an auxiliary feature assisted adaption feature 214 and the additional task feature 215.

Figure 4:
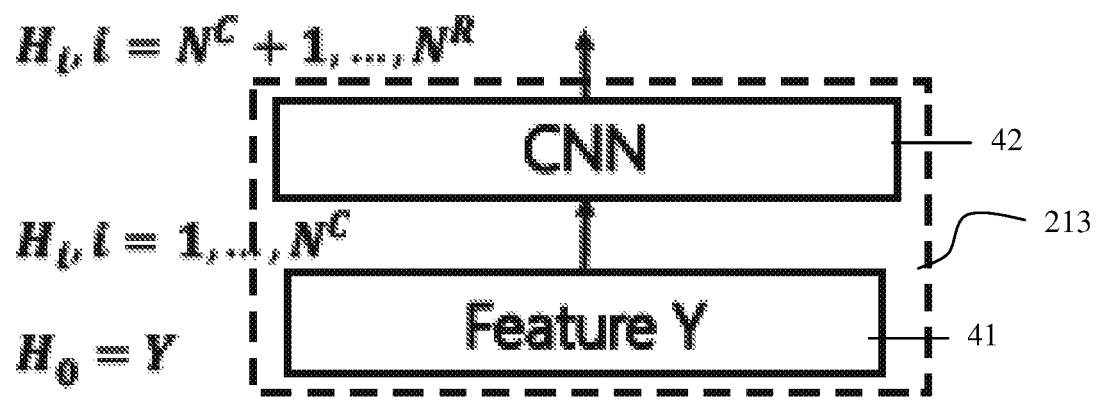
FIG. 4 is a block diagram illustrating a CNN structure according to an embodiment.

The CNN feature 213, as further illustrated in FIG. 4, is described herein according to an embodiment. According to an embodiment, the CNN feature 213, uses convolutional operations (CNN 42 in FIG. 4) to extract shift-invariant features from speech signals (Feature Y 41 in FIG. 4) and uses BLSTMs to perform speaker tracing and speech separation and recognition based on the convolutional operations. For instance, while RNNs can take advantage of the long-range dependency, the RNNs only model correlation along the time axis and ignore the structure along the frequency axis, which contains useful information for speaker tracing. In contrast, according to an embodiment, the CNN introduce the convolutional operation into the PIT-ASR model by modelling the speech signals along both time and frequency axes. Specifically, this CNN-BLSTM architecture computes $$H_0 = Y \qquad (2)$$

$$H_i = \text{CNN}_i(H_{i-1}), i=1, \ldots, N^C \qquad (3)$$

$$H_i^f = \text{LSTM}_i^f(H_{i-1}), i=N^C+1, \ldots, N^R \qquad (4)$$

$$H_i^b = \text{LSTM}_i^b(H_{i-1}), i=N^C+1, \ldots, N^R \qquad (5)$$

$$H_i = \text{Stack}(H_i^f, H_i^b), i=N^C+1, \ldots, N^R \qquad (6)$$

$$H_o^s = \text{Linear}(H_{N^R}), s=1, \ldots, S \qquad (7)$$

$$O^s = \text{Softmax}(H_O^s), s=1, \ldots, S \qquad (8)$$

where $H_0$ is the input speech data, $N^C$ and $N^R$ are the layer indices of the previous CNN and LSTM layers. $\text{LSTM}_i^f$ and $\text{LSTM}_i^b$ are the forward and backward LSTMs at hidden layer i respectively. $H_o^s$, s=1, ..., S is the excitation at output layer for each speech stream s. Note that, each output layer represents an estimate of the senone posterior probability for a speech stream. No additional clustering or speaker tracing is needed. The acoustic model is trained by minimizing the objective function as in equation 1.

For instance, equation (3) performs convolutional operations on the input feature maps. According to an embodiment, hyper-parameters, such as the number of CNN layers and the kernel size for the CNN may be configured based on the multi-talker speech recognition. Further, pooling layers may also be configured after the convolutional layers based on the multi-talker speech recognition. According to an embodiment, in equations (4), (5) and (6) the long short-term memory (LSTM) after the CNN concatenated. For instance, equation (6) is the stack function configured to concatenate the forward and backward LSTM hidden vectors together to be one vector instead of two separate ones, and the concatenated output is input to the linear equation (7) for each speaker individually. In equation (8), a softmax activation is computed for the output of the linear equation (7), which may be referred to the senone posteriori in speech recognition tasks. According to an embodiment, the softmax equation (8) is a normalization technique which calculates $$P(y = j | x) = \frac{e^{x_i}}{\sum_{k=1}^K e^{x_k}},$$

where x is the output vector of linear (7).

Figure 6:
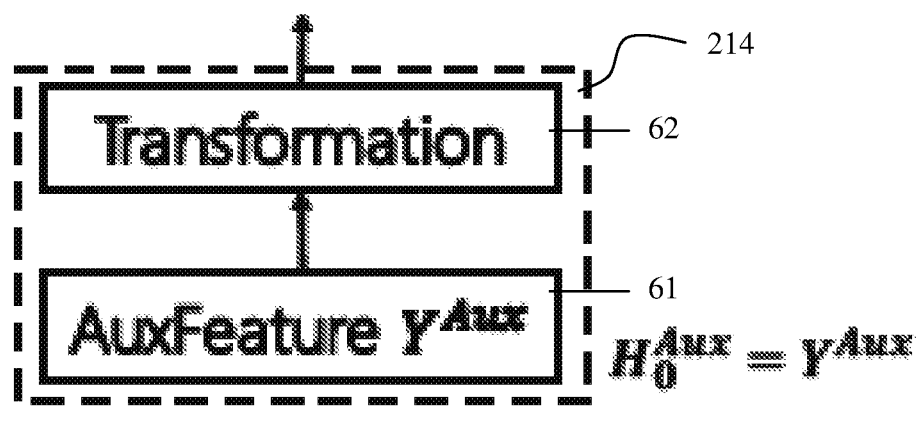
FIG. 6 is a block diagram illustrating an auxiliary feature assisted adaptation in the PIT architecture according to an embodiment.

Next, the auxiliary feature assisted adaptation features 214, as further illustrated in FIG. 6, is herein described according to an embodiment. The auxiliary feature assisted adaptation feature 214 may use auxiliary features to make the multi-talker model speaker-aware to help with speaker tracing and to improve speech separation and recognition.

According to an embodiment, "AuxFeature $Y^{Aux}$" feature 61 in FIG. 6 is an auxiliary feature extracted from the multi-talker speech data. Next, the auxiliary features goes through in "Transformation" layer 62. According to an embodiment, the Transformation layer 62 is a multi-layer perceptron. The output of the transformation layer (i.e., the converted data) is concatenated with the output of CNN, and the concatenated result is treated as the input to the RNN in FIG. 2.

According to an embodiment, the auxiliary features may be speaker characterizing features such as pitch, i-vector, and gender-pair. Pitch is important information to differentiate speakers. For example, the F0 of female is usually higher than that of male. According to an embodiment, the auxiliary feature assisted adaptation features 214 may utilize a pitch extraction tool to find lag values that maximize the Normalized Cross Correlation Function (NCCF) and the pitch and NCCF at each frame. Moreover, i-vector is also considered good representation of speaker identity. To extract i-vectors, the auxiliary feature assisted adaptation features 214 may derive a super-vector M from the universal background model (UBM) to represent the combination of speaker and session. The probability model of the super-vector is $$M = m + Tw \quad (9)$$

where m is a speaker- and session-independent super-vector, T is a low rank matrix which captures the speaker and session variability, and i-vector is the posterior mean of w.

According to an embodiment, the auxiliary feature assisted adaptation feature 214 may integrate the pitch and i-vector extracted from the mixed-speech into PIT-ASR model, and make the multi-talker model speaker-aware. For instance, to adapt the acoustic model to a certain speaker-pair, the acoustic model with speaker characterizing features as auxiliary features are provided.

According to an embodiment, for BLSTM-RNNs, the acoustic model is adapted to a certain speaker-pair by augmenting the speech features with auxiliary features. According to another embodiment, for CNN-BLSTMs, a transformation layer is added to convert the auxiliary features $Y^{Aux}$ to an intermediate representation. The transformed representation is combined with the feature maps from the convolutional layers and fed into the following BLSTM layers.

Figure 8:
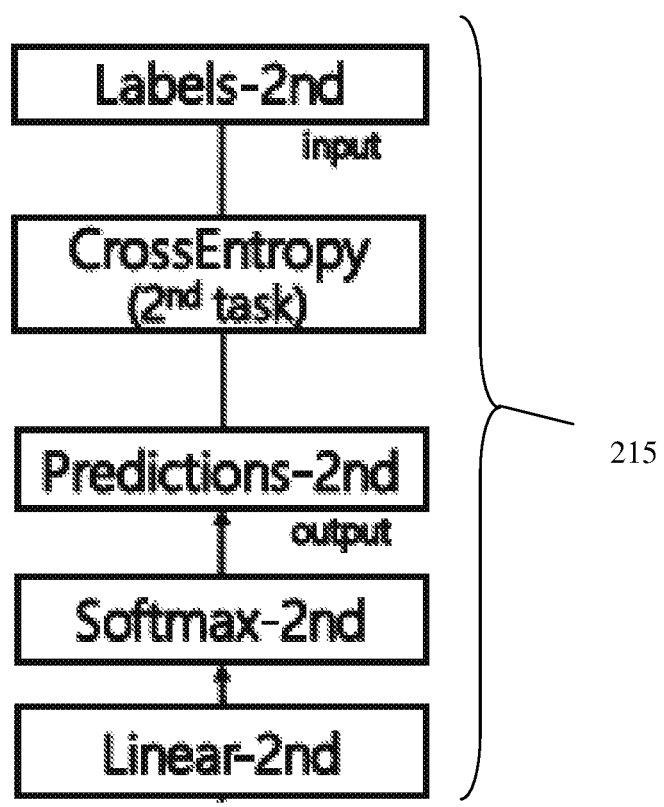
FIG. 8 is a block diagram illustrating an auxiliary feature assisted adaptation in the PIT architecture according to another embodiment.

Next, the additional task feature 215, as further illustrated in FIG. 8, is described according to an embodiment. According to an embodiment, the additional task feature 215, utilizes gender classification of the speech to improve speech recognition. The vocal tract lengths for males and females are notably different. However, they are very close for same-gender speakers. NPL documents 4 and 5 describe that multi-talker speech separation and recognition are much harder on same-gender mixed speech than on opposite-gender mixed speech. According to a related art technique, which would make the system very complex, a separate model is trained for each gender combination. In contrast, according to an embodiment of the present disclosure, a different yet simpler solution is offered, which includes providing gender-pair information to the model at training time. For instance, according to an embodiment, the gender-pair is encoded as a 3-dim one-hot vector to represent the conditions of 'Male+Male', 'Female+Female', 'Opposite-Gender'.

According to an embodiment, the additional task feature 215 exploits the gender-pair information without estimating them during testing. More specifically, the additional task feature 215 trains the PIT-ASR model with an additional gender classification task. The cross entropy criterion is used for this additional task and the final objective function is $$J^{MTL} = J + \lambda \sum_{t} CE(l_t^{2nd}, O_t^{2nd}), \quad (10)$$

where $J^{MTL}$ is the criterion for multi-task learning, $l^{2nd}$ is a ground truth label of the additional task and $O^{2nd}$ is an output segment (i.e., model predictions) of the additional task, and J is the major task using the PIT criterion shown in equation 1. The hyper-parameter λ can be tuned on a development set. Accordingly, the processor may update the acoustic model based on minimizing the minimal average cross entropy.

According to an embodiment, in the PIT model training technique without the additional task feature 214 as illustrated in FIG. 8, the loss is only the minimum cross entropy loss. However, with the additional task feature 214, the PIT model is training with an additional loss, which helps the speaker tracing ability and stability. Further, the additional task feature helps to adapt the model to speakers which gives better recognition performances.

According to an embodiment, after model training, the parameters and components related only to the secondary task can be removed and the model can be evaluated without estimating the auxiliary information (such as the gender-pair vector) related to the secondary task.

Figure 3:
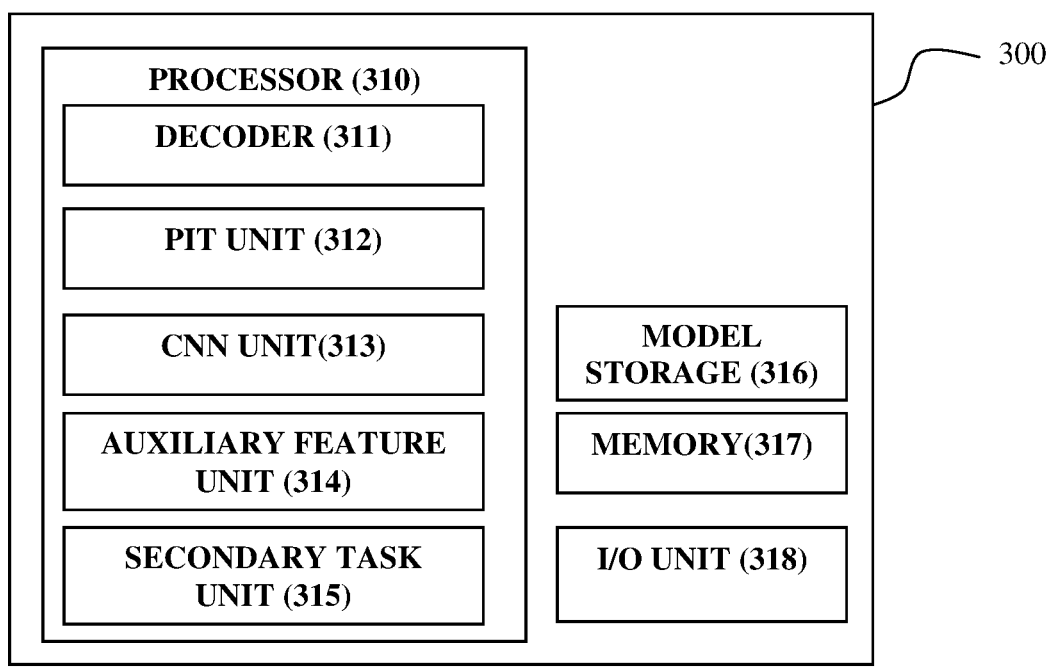
FIG. 3 is an apparatus implementing the adaptive PIT architecture in FIG. 2 according to an embodiment.

FIG. 3 shows an apparatus 300 implementing the adaptive permutation invariant training architecture 200 according to an embodiment. The apparatus 300 may include a processor 310, model storage 316, memory 317 and input/output unit 318. According to an embodiment, the processor 310 may be further configured to implement a decoder 311, a PIT unit 312, a CNN unit 313, and auxiliary feature unit 314 and a secondary task unit 315. According to another embodiment, the processor 310 may not implement all of the decoder 311, the PIT unit 312, the CNN unit 313, the auxiliary feature unit 314 and the secondary task unit 315. Instead, the apparatus 300 may include some of the decoder 311, the PIT unit 312, the CNN unit 313, the auxiliary feature unit 314 and the secondary task unit 315.

According to an embodiment, the model storage 316 may be configured to store an acoustic model, bidirectional long-short term memory, recurrent neural networks, convolutional neural network, and other models and networks associated with PIT.

According to an embodiment, the processor 310 may be configured to receive a stream of speech data through the I/O unit 318. According to an embodiment, the stream of speech data may include speech data from multiple speakers speaking at the same time and may further include only a single channel of mixed speech data. Also, the speech data may have structures along both time and frequency axes.

According to an embodiment, the PIT unit 312 may be configured to perform the PIT framework illustrated in FIGS. 1 and 2 and the decoder 311 may decode speech data based on the PIT model training.

According to an embodiment, the CNN unit 313 may extract shift-invariant features from the stream of data by performing convolution operations. Thereafter, the CNN unit 313 may perform a BLSTM operation based on the extracted shift variant feature from the stream of speech data. Next, the CNN unit 313 may minimize an overall minimal average cross entropy (CE) of the BLSTM operation on the stream of speech data and update the acoustic model in the model storage 316 based on minimizing the minimal average cross entropy (CE).

According to an embodiment, the CNN-BLSTM operations performed by the CNN unit 313 may include the following computation:

$$H_0 = Y \quad (2)$$

$$H_i = CNN_i(H_{i-1}), i=1, \ldots, N^C \quad (3)$$

$$H_i^f = LSTM_i^f(H_{i-1}), i=N^C+1, \ldots, N^R \quad (4)$$

$$H_i^b = \text{LSTM}_i^b(H_{i-1}), i=N^C+1, \ldots, N^R \tag{5}$$

$$H_i = \text{Stack}(H_i^f, H_i^b), i=N^C+1, \ldots, N^R \tag{6}$$

$$H_o^s = \text{Linear}(H_{N^R}), s=1, \ldots, S \tag{7}$$

$$O^s = \text{Softmax}(H_O^s), s=1, \ldots, S \tag{8}$$

where $H_0$ is the input speech data, $N^C$ and $N^R$ are the layer indices of the previous CNN and LSTM layers. $\text{LSTM}_i^f$ and $\text{LSTM}_i^b$ are the forward and backward LSTMs at hidden layer i respectively. $H_o^s$, $s=1, \ldots, S$ is the excitation at output layer for each speech stream s. Note that, each output layer represents an estimate of the senone posterior probability for a speech stream. No additional clustering or speaker tracing is needed. The acoustic model is trained by minimizing the objective function as in equation 1.

According to an embodiment, the auxiliary features unit 314 may be configured to perform an auxiliary feature assisted adaptation using RNN in the PIT architecture. According to an embodiment, the auxiliary features unit 314 may extract auxiliary feature from the stream of data. According to an embodiment, the auxiliary features may be a pitch or i-vector uniquely representing identification of each of the multiple speakers.

Further, the auxiliary features unit 314 may the augment the auxiliary feature with feature maps of the stream of speech data and perform a BLSTM-RNN operation based on the combined intermediate representation with feature maps of the stream of speech data. Thereafter, the auxiliary features unit 314 may minimize an overall minimal average cross entropy (CE) of the BLSTM operation on the stream of speech data and update the acoustic model based on minimizing the minimal average cross entropy (CE).

According to another embodiment, the auxiliary features unit 314 may be configured to perform an auxiliary feature assisted adaptation using CNN in the PIT architecture.

According to an embodiment, the auxiliary features unit 314 may extract auxiliary feature from the stream of data. According to an embodiment, the auxiliary features may be a pitch or i-vector uniquely representing identification of each of the multiple speakers.

Next, the auxiliary features unit 314 may convert the auxiliary feature to an intermediate representation and combine the intermediate representation with feature maps of the stream of speech data from convolution layers of the convolution neural network. Thereafter, the auxiliary features unit 314 may perform a BLSTM operation based on the combined intermediate representation with feature maps of the stream of speech data. Thereafter, the auxiliary features unit 314 may minimize an overall minimal average cross entropy (CE) of the BLSTM operation on the stream of speech data and update the acoustic model based on minimizing the minimal average cross entropy (CE).

According to an embodiment, the secondary task unit 315 may be configured to perform an auxiliary feature assisted adaptation using multitask frame work in the PIT architecture.

According to an embodiment, the secondary task unit 315 may extract auxiliary feature from the stream of speech data. The auxiliary feature may be gender classification information uniquely corresponding to each of the multiple speakers. Next, the secondary task unit 315 may perform multi-task learning by simultaneously performing a BLSTM operation on the stream of speech data and a secondary gender classification operation based on the extracted gender classification information.

Thereafter, the secondary task unit 315 may minimize an overall minimal average cross entropy (CE) of the multitask learning by minimizing minimal average cross entropy (CE) for the BLSTM operation on the stream of speech data and the gender classification operation. According to an embodiment, the final objective function of the cross entropy criterion used for this multitask learning is $$J^{MTL} = J + \lambda \sum_t CE(l_t^{2nd}, O_t^{2nd}) \tag{10}$$

where JMTL is the criterion for multi-task learning, I2nd is a ground truth label of the additional task and O2nd is an output segment (i.e., model predictions) of the additional task, and J is the major task using the PIT criterion shown in equation 1. The hyper-parameter $\lambda$ can be tuned on a development set.

According to an embodiment, the secondary task unit 315 may update the acoustic model based on minimizing the minimal average cross entropy.

Figure 5:
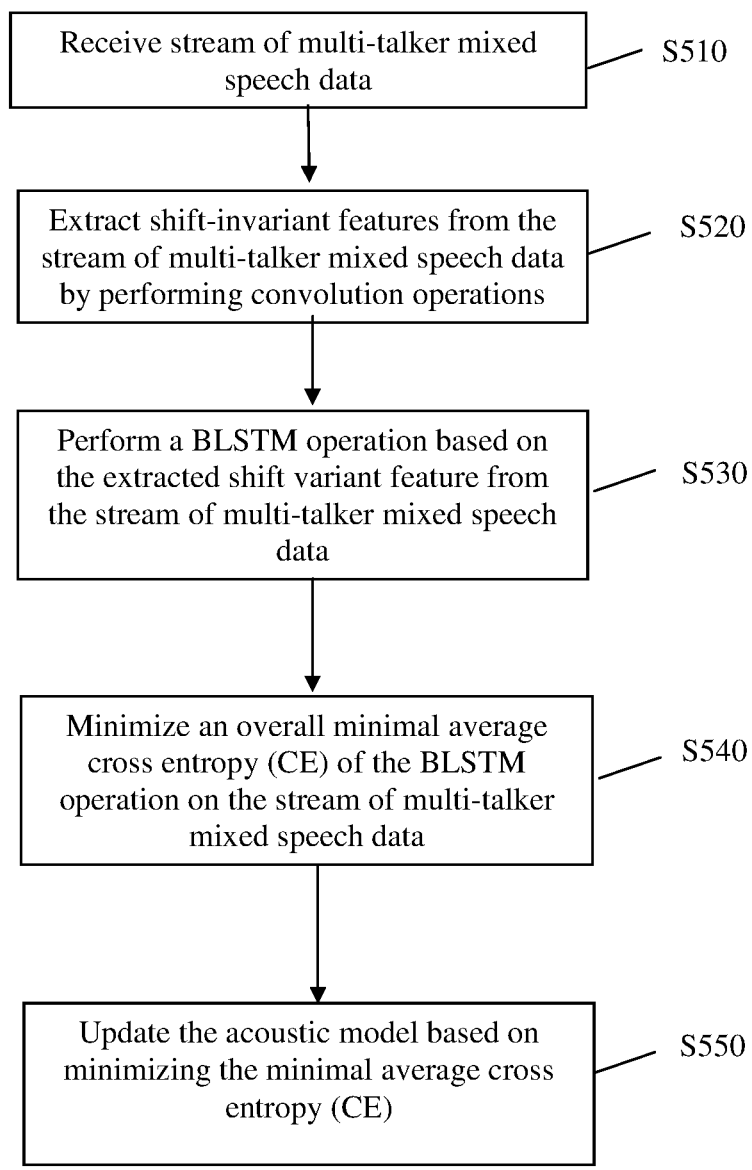
FIG. 5 is flowchart illustrating operations of the CNN structure of FIG. 4 according to an embodiment.

FIG. 5 is flowchart illustrating operations of the convolution neural network structure of FIG. 5 according to an embodiment.

At S510, a processor may receive a stream of speech data. According to an embodiment, the stream of speech data may include speech data from multiple speakers speaking at the same time and may further include only a single channel of mixed speech data. Also, the speech data may have structures along both time and frequency axes.

At S520, the processor may extract shift-invariant features from the stream of speech data by performing convolution operations. Thereafter, at S530, the processor may perform a BLSTM operation based on the extracted shift variant feature from the stream of speech data. At 540, the processor may minimize an overall minimal average cross entropy (CE) of the BLSTM operation on the stream of speech data and at S550, the processor may update the acoustic model based on minimizing the minimal average cross entropy (CE).

According to an embodiment, the CNN-BLSTM operations performed in S520, S520, 530, 540 and 550 may include the following computation:

$$H_0 = Y \tag{2}$$

$$H_i = \text{CNN}_i(H_{i-1}), i=1, \ldots, N^C \tag{3}$$

$$H_i^f = \text{LSTM}_i^f(H_{i-1}), i=N^C+1, \ldots, N^R \tag{4}$$

$$H_i^b = \text{LSTM}_i^b(H_{i-1}), i=N^C+1, \ldots, N^R \tag{5}$$

$$H_i = \text{Stack}(H_i^f, H_i^b), i=N^C+1, \ldots, N^R \tag{6}$$

$$H_o^s = \text{Linear}(H_{N^R}), s=1, \ldots, S \tag{7}$$

$$O^s = \text{Softmax}(H_O^s), s=1, \ldots, S \tag{8}$$

where $H_0$ is the input speech data, $N^C$ and $N^R$ are the layer indices of the previous CNN and LSTM layers. $\text{LSTM}_i^f$ and $\text{LSTM}_i^b$ are the forward and backward LSTMs at hidden layer i respectively. $H_o^s$, $s=1, \ldots, S$ is the excitation at output layer for each speech stream s. Note that, each output layer represents an estimate of the senone posterior probability for a speech stream. No additional clustering or speaker tracing is needed. The acoustic model is trained by minimizing the objective function as in equation 1.

Figure 7A:
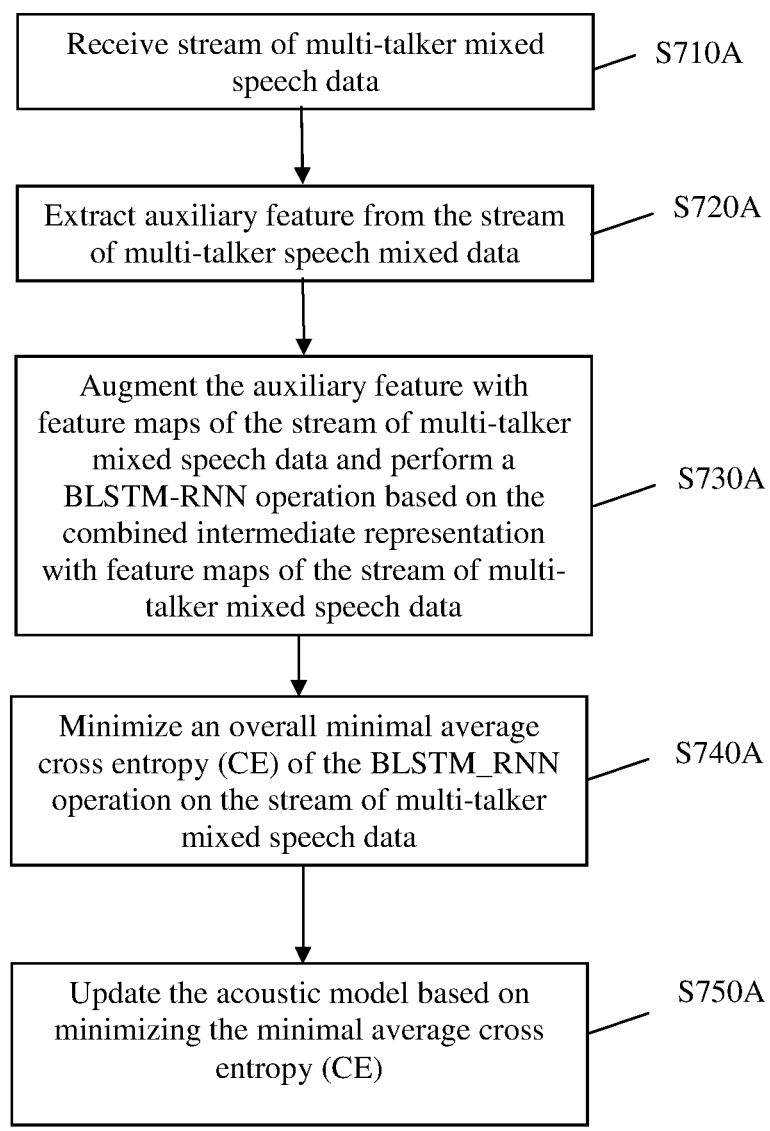

FIG. 7A is a flowchart illustrating operations of the auxiliary feature assisted adaptation using RNN in the PIT architecture of FIG. 6 according to an embodiment.

At S710A, a processor may receive a stream of speech data. According to an embodiment, the stream of speech data may include speech data from multiple speakers speaking at the same time and may further include only a single channel of mixed speech data. Also, the speech data may have structures along both time and frequency axes.

At S720A, the processor may extract auxiliary feature from the stream of data. According to an embodiment, the auxiliary features may be a pitch or i-vector uniquely representing identification of each of the multiple speakers.

At S730A, the processor may the augment the auxiliary feature with feature maps of the stream of speech data and perform a BLSTM-RNN operation based on the combined intermediate representation with feature maps of the stream of speech data.

At S740A, the processor may minimize an overall minimal average cross entropy (CE) of the BLSTM operation on the stream of speech data and at S750A, the processor may update the acoustic model based on minimizing the minimal average cross entropy (CE).

FIG. 7B is a flowchart illustrating operations of the auxiliary feature assisted adaptation using CNN in the PIT architecture of FIG. 6 according to an embodiment.

At S710B, a processor may receive a stream of speech data. According to an embodiment, the stream of speech data may include speech data from multiple speakers speaking at the same time and may further include only a single channel of mixed speech data. Also, the speech data may have structures along both time and frequency axes.

At S720B, the processor may extract auxiliary feature from the stream of data. According to an embodiment, the auxiliary features may be a pitch or i-vector uniquely representing identification of each of the multiple speakers.

At S730B, the processor may convert the auxiliary feature to an intermediate representation and at S740B, the processor may combine the intermediate representation with feature maps of the stream of speech data from convolution layers of the convolution neural network.

At S750B, the processor may perform a BLSTM operation based on the combined intermediate representation with feature maps of the stream of speech data.

At S760B, the processor may minimize an overall minimal average cross entropy (CE) of the BLSTM operation on the stream of speech data and at S770B, the processor may update the acoustic model based on minimizing the minimal average cross entropy (CE).

Figure 9:
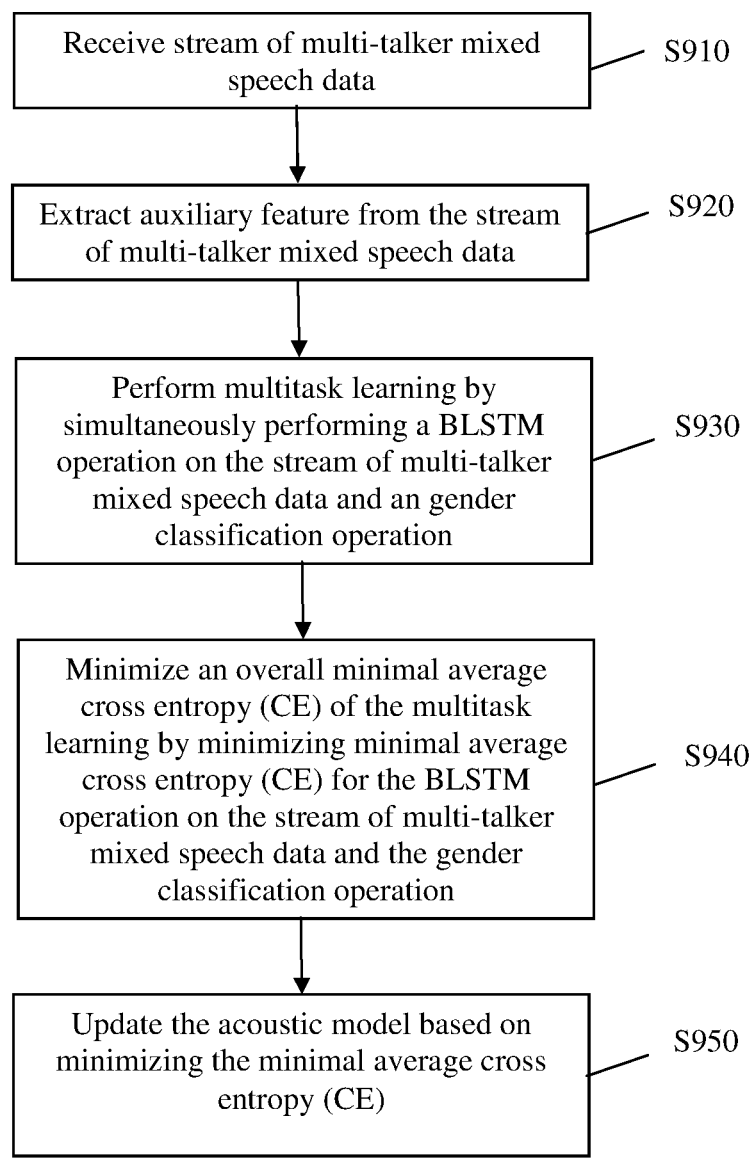
FIG. 9 is flowchart illustrating operations of the auxiliary feature assisted adaptation in the PIT architecture of FIG. 8 according to another embodiment.

FIG. 9 is flowchart illustrating operations of the auxiliary feature assisted adaptation in the PIT architecture of FIG. 7 according to another embodiment.

At S910, a processor may receive a stream of speech data. According to an embodiment, the stream of speech data may include speech data from multiple speakers speaking at the same time and may further include only a single channel of mixed speech data. Also, the speech data may have structures along both time and frequency axes.

At S920, the processor may extract auxiliary feature from the stream of data. According to an embodiment, the auxiliary features may be gender classification information uniquely corresponding to multiple speakers. Thereafter, at S930, the processor may perform multitask learning by simultaneously performing a BLSTM operation on the stream of speech data and a secondary gender classification operation, i.e., an additional task, based on the extracted gender classification information.

In particular, according to an embodiment, during the backward propagation process, the loss of the additional task contributes to the gradient of the parameters in the RNN layer in FIG. 2, which improves the training of the entire model.

At 940, the processor may minimize an overall minimal average cross entropy (CE) of the multitask learning by minimizing minimal average cross entropy (CE) for the BLSTM operation on the stream of speech data and the gender classification operation. According to an embodiment, the final objective function of the cross entropy criterion used for this multitask learning is $$J^{MTL} = J + \lambda \sum_t CE(l_t^{2nd}, O_t^{2nd}) \qquad (10)$$

where JMTL is the criterion for multi-task learning, l2nd is a ground truth label of the additional task and O2nd is an output segment (i.e., model predictions) of the additional task, and J is the major task using the PIT criterion shown in equation 1. The hyper-parameter $\lambda$ can be tuned on a development set.

At S950, the processor may update the acoustic model based on minimizing the minimal average cross entropy.

According to an embodiment, after model training, the parameters and components related only to the secondary task can be removed and the model can be evaluated without estimating the auxiliary information (such as the gender-pair vector) related to the secondary task.

According to one or more embodiments, the CNN-BLSTM structure achieves a better system performance that the related art BLSTM-RNNs used in related art PIT-ASR.

According to one or more embodiments, implementing adaptive training with auxiliary feature for PIT framework targeted on multi-talker speech recognition, including the auxiliary feature such as pitch, i-vectors, achieves a better system performance compared to a related art PIT framework.

According to one or more embodiments, implementing gender-pair information with multi-task learning for PIT framework targeted on multi-talker speech recognition, achieves a better system performance compared to a related art PIT framework. For instance, according to one or more embodiment, the gender information may be encoded implicitly, and therefore no extra computation and processing stage in testing may be necessary.

According to one or more embodiments, the techniques implementing adaptive training with auxiliary feature for PIT framework and the techniques implementing gender-pair information with multi-task learning for PIT may be combined, which achieves an even greater system performance compared to a related art PIT framework. For instance, additional gaining in system performance can be achieved by combining the adaptive training with auxiliary feature at the input layer with the gender-pair information exploration with multi-task learning at the output layer.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor, hardware circuitry or any other device capable of responding to and executing instructions in a defined manner. The processing device also may access, store, manipulate, process, and create data in response to execution of the software.

The software may include a computer program, a piece of code, an instruction, or some combination thereof, to independently or collectively instruct or configure the processing device to operate as desired. The method according to the above-described example embodiments may be recorded in non-transitory computer-readable media including program instructions to implement various operations of the above-described example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Experimental Results

Some results comparisons are illustrated as the following tables:

Traditional BLSTM vs. CNN-BLSTM according to an embodiment.

TABLE 1

WER (%) of the PIT-ASR model with different model structures and gender combinations

| Model | Gender Combination | WER 1 | WER 2 |
|---|---|---|---|
| BLSTM | All | 55.21 | 64.23 |
|  | opposite | 52.41 | 61.61 |
|  | same | 58.48 | 67.27 |
| CNN-BLSTM | All | 51.93 | 60.13 |
|  | opposite | 49.40 | 57.90 |
|  | same | 54.89 | 62.72 |

Adaptive training for PIT with auxiliary feature.

TABLE 2

WER (%) of PIT-ASR with auxiliary feature based adaptation

| Model | Adapt on | WER 1 | WER 2 |
|---|---|---|---|
| BLSTM | — | 55.21 | 64.23 |
|  | pitch | 51.88 | 60.54 |
|  | i-vector | 51.61 | 59.99 |
|  | pitch + i-vector | 51.29 | 59.78 |
| CNN-BLSTM | pitch + i-vector | 50.64 | 58.78 |

Gender-pair information with multi-task learning

TABLE 3

WER (%) of PIT-ASR with multi-task learning

| Model | 2nd Task | Adapt on | WER 1 | WER 2 |
|---|---|---|---|---|
| BLSTM | — | — | 55.21 | 64.23 |
|  | gender | — | 52.47 | 60.31 |
|  | gender | pitch + i-vector | 51.11 | 59.35 |

TABLE 3-continued

WER (%) of PIT-ASR with multi-task learning

| Model | 2nd Task | Adapt on | WER 1 | WER 2 |
|---|---|---|---|---|
| CNN-BLSTM | — | — | 51.93 | 60.13 |
|  | gender | — | 51.10 | 58.76 |
|  | gender | pitch + i-vector | 50.21 | 58.17 |

The present disclosure has been described above with reference to embodiments. However, those of ordinary skill in the art will understand that various changes in form and details may be made therein without departing from the spirit and scope of the present disclosure as defined by the appended claims. Therefore, the above embodiments should be considered in descriptive sense only and not for purposes of limitation. Thus, the scope of the present disclosure may be defined not by the above detailed descriptions but by the appended claims, and all differences within the scope will be construed as being included in the present disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of performing speech recognition training performed by at least one processor, the method comprising:
   acquiring, by the at least one processor, multi-talker mixed speech data corresponding to a plurality of speakers;
   extracting, by the at least one processor, an auxiliary feature corresponding to a speech characteristic of the plurality of speakers; and
   updating, by the at least one processor, an acoustic model by performing permutation invariant training (PIT) model training based on the auxiliary feature.

2. The method of claim 1, wherein the performing the PIT model training based on the auxiliary feature comprises:
   augmenting speech features in the multi-talker mixed speech data with the speech characteristic of the plurality of speakers.

3. The method of claim 1, wherein the performing the PIT model training based on the auxiliary feature comprises:
   performing a bidirectional long-short term memory (BLSTM) operation on the multi-talker mixed speech data by automatically assigning labels to the speech features of the multi-talker mixed speech data and generating a plurality of estimated output segments for the multi-talker mixed speech data; and
   minimizing a minimal average cross entropy (CE) for utterances of all possible label assignments corresponding to the plurality of estimated output segments for the multi-talker mixed speech data based on a first equation:

$$J = \frac{1}{S} \min_{s' \in permu(S)} \sum_{s} \sum_{t} CE(l_t^{s'}, y_t^s)$$

wherein permu(S) is a permutation of 1, . . . , S, $l^s$ is a ground truth label and $y^s$ is an estimated output segment among the plurality of estimated output segments of the multi-talker mixed the speech data.

4. The method of claim 1, wherein the performing the PIT model training based on the auxiliary feature comprises:
performing a bidirectional long-short term memory recurrent neural networks (BLSTM-RNN) operation on the multi-talker mixed speech data by augmenting speech features in the multi-talker mixed speech data with the speech characteristic of the plurality of speakers.

5. The method of claim 1, wherein the performing the PIT model training based on the auxiliary feature comprises:
converting the auxiliary feature to an intermediate representation; and
performing a convolutional neural network bidirectional long-short term memory (CNN-BLSTM) operation on the multi-talker mixed speech data by combining the intermediate representation with feature maps of the multi-talker mixed speech data from convolution layers of the CNN.

6. The method of claim 1, wherein the auxiliary feature is one of pitch and i-vector uniquely identifying the plurality of speakers.

7. The method of claim 3, the updating the acoustic model comprises:
performing a multi-task learning framework, in which, an additional operation corresponding to the auxiliary feature is performed while the BLSTM operation on the multi-talker mixed speech data is performed.

8. The method of claim 7, wherein the additional operation comprises:
calculating a second equation:

$$J^{MTL} = J + \lambda \sum_t CE(l_t^{2nd}, O_t^{2nd}),$$

wherein $I^{2nd}$ is a ground truth label of the additional operation and $O^{2nd}$ is an output segment of the additional operation, and
wherein the acoustic model is updated based on a result of the calculating the second equation.

9. The method of claim 7, the auxiliary feature is a gender classification of the plurality of speakers.

10. A speech recognition training apparatus comprising:
at least one memory operable to store program code; and
at least one processor operable to read said program code and operate as instructed by said program code, said program code comprising:
acquiring code configured to acquire multi-talker mixed speech data corresponding to a plurality of speakers;
extracting code configured to extract an auxiliary feature corresponding to a speech characteristic of the plurality of speakers; and
updating code configured to update an acoustic model by performing permutation invariant training (PIT) model training based on the auxiliary feature.

11. The speech recognition training apparatus of claim 10, wherein the updating code is further configured to perform the PIT model training based on the auxiliary feature by augmenting speech features in the multi-talker mixed speech data with the speech characteristic of the plurality of speakers.

12. The speech recognition training apparatus of claim 10, wherein the updating code is further configured to perform the PIT model training based on the auxiliary feature by:
performing a bidirectional long-short term memory (BLSTM) operation on the multi-talker mixed speech data by automatically assigning labels to the speech features of the multi-talker mixed speech data and generating a plurality of estimated output segments for the multi-talker mixed speech data; and
minimizing a minimal average cross entropy (CE) for utterances of all possible label assignments corresponding to the plurality of estimated output segments for the multi-talker mixed speech data according to the following equation:

$$J = \frac{1}{S} \min_{s' \in permu(S)} \sum_s \sum_t CE(l_t^{s'}, y_t^s)$$

wherein permu(S) is a permutation of 1, . . . , S, $l^s$ is a ground truth alignment and $y^s$ is the plurality of estimated output segments of the multi-talker mixed speech data.

13. The speech recognition training apparatus of claim 10, wherein the updating code is further configured to perform the PIT model training based on the auxiliary feature comprises by performing a bidirectional long-short term memory recurrent neural networks (BLSTM-RNN) operation on the multi-talker mixed speech data by augmenting speech features in the multi-talker mixed speech data with the speech characteristic of the plurality of speakers.

14. The speech recognition training apparatus of claim 10, wherein the updating code is further configured to perform the PIT model training based on the auxiliary features comprises by:
converting the auxiliary feature to an intermediate representation; and
performing a convolutional neural network bidirectional long-short term memory (CNN-BLSTM) operation on the multi-talker mixed speech data by combining the intermediate representation with feature maps of the multi-talker mixed speech data from convolution layers of the CNN.

15. The speech recognition training apparatus of claim 10, wherein the auxiliary feature is one of pitch and i-vector uniquely identifying the plurality of speakers.

16. The speech recognition training apparatus of claim 12, wherein the updating code is further configured to update the acoustic model by performing a multi-task learning framework, in which, an additional operation corresponding to the auxiliary feature is performed while the BLSTM operation on the multi-talker mixed speech data is performed.

17. The speech recognition training apparatus of claim 16, wherein the additional operation comprises:
calculating a second equation:

$$J^{MTL} = J + \lambda \sum_t CE(l_t^{2nd}, O_t^{2nd}),$$

wherein $I^{2nd}$ is a ground truth label of the additional operation and $O^{2nd}$ is an output segment of the additional operation, and
wherein the acoustic model is updated based on a result of the calculating the second equation.

18. The speech recognition training apparatus of claim 16, the auxiliary feature is a gender classification of the plurality of speakers.

19. A non-transitory computer readable medium having stored thereon a program for a method of performing speech recognition, the method comprising:
- acquiring multi-talker mixed speech data from a plurality of speakers;
- extracting an auxiliary feature corresponding to a speech characteristic of the plurality of speakers; and
- updating an acoustic model by performing permutation invariant training (PIT) model training based on the auxiliary feature.

* * * * *